United States Patent
Li et al.

(10) Patent No.: US 11,861,823 B2
(45) Date of Patent: Jan. 2, 2024

(54) MICROFLUIDIC DEVICE AND METHOD FOR QUANTIFYING CONTACT LENS DEPOSITION

(71) Applicant: Johnson & Johnson Vision Care, Inc., Jacksonville, FL (US)

(72) Inventors: Zhenyu Li, Washington, DC (US); Bailin Liang, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 183 days.

(21) Appl. No.: 17/242,221

(22) Filed: Apr. 27, 2021

(65) Prior Publication Data

US 2022/0343480 A1 Oct. 27, 2022

(51) Int. Cl.
G06T 7/00 (2017.01)
G01N 21/88 (2006.01)
G01N 21/958 (2006.01)

(52) U.S. Cl.
CPC ......... G06T 7/001 (2013.01); G01N 21/8851 (2013.01); G01N 21/958 (2013.01);
(Continued)

(58) Field of Classification Search
CPC .... G01N 33/6884; G01N 33/88; G01N 33/94; G01N 35/00; G01N 1/2813; G01N 1/286; G01N 1/31; G01N 15/0255; G01N 15/10; G01N 15/1468; G01N 2001/007; G01N 2015/0261; G01N 2015/1087; G01N 2021/6439; G01N 2021/6471;
(Continued)

(56) References Cited

U.S. PATENT DOCUMENTS 10,809,181 B2 * 10/2020 Justynska-Reimann ..................... G01N 19/02
2002/0163638 A1 11/2002 Biel et al.
(Continued)

FOREIGN PATENT DOCUMENTS

CN 101680742 A * 3/2010 ............... G01B 9/02
EP 0453231 10/1991
(Continued)

OTHER PUBLICATIONS

Guan Allan, "Microfluidic Tool development for Contact Lens Regulatory Science and Personalized Ophthalmology", Dissertation, 139 pages, May 15, 2016.
(Continued)

*Primary Examiner* — Michael P Stafira
(74) *Attorney, Agent, or Firm* — Kristina Okafor

(57) ABSTRACT

Disclosed herein are methods for quantifying contact lens deposition. An example method may comprise disposing a contact lens sample in a fluid well. The example method may comprise disposing a volume of tear fluid in the well with the contact lens sample. The example method may comprise capturing pre-rinse images of the contact lens sample. The example method may comprise rinsing the contact lens sample. The example method may comprise capturing post-rinse images of the contact lens after the rinsing. The example method may comprise determining, using one or more of the tear images or the post-rinse images, a deposition metric. The example method may comprise outputting the deposition metric.

79 Claims, 12 Drawing Sheets

(52) U.S. Cl.
CPC ............... *G01N 2021/9583* (2013.01); *G06T 2207/10056* (2013.01)

(58) Field of Classification Search
CPC . G01N 2021/6482; G01N 2035/00148; G01N 2035/00356; G01N 2035/0405; G01N 2035/0441; G01N 2035/0443; G01N 2035/0444; G01N 2035/0446; G01N 2035/1025; G01N 2035/1076; G01N 2035/1086; G01N 21/4795; G01N 21/64; G01N 21/6445; G01N 21/6458; G01N 21/76; G01N 21/84; G01N 2201/0646; G01N 23/2273; G01N 2333/02; G01N 2333/08; G01N 2333/14; G01N 2333/165; G01N 2333/4704; G01N 2333/4737; G01N 2333/515; G01N 2333/52; G01N 2333/57; G01N 2333/645; G01N 2333/70567; G01N 2333/7155; G01N 2333/9015; G01N 2333/91017; G01N 2333/9108; G01N 2333/91205; G01N 2333/948; G01N 2333/952; G01N 2333/96413; G01N 2333/96469; G01N 2333/96494; G01N 2400/00; G01N 2500/20; G01N 27/126; G01N 27/127; G01N 27/3271; G01N 2800/02; G01N 2800/065; G01N 2800/102; G01N 2800/108; G01N 2800/24; G01N 2800/2864; G01N 2800/303; G01N 2800/323; G01N 2800/7047; G01N 30/02; G01N 33/48; G01N 33/5067; G01N 33/5079; G01N 33/5302; G01N 33/5306; G01N 33/531; G01N 33/532; G01N 33/542; G01N 33/5434; G01N 33/54353; G01N 33/54373; G01N 33/563; G01N 33/564; G01N 33/56916; G01N 33/5743; G01N 33/57473; G01N 33/5748; G01N 33/5762; G01N 33/581; G01N 33/588; G01N 33/66; G01N 33/6845; G01N 33/6866; G01N 33/746; G01N 33/82; G01N 35/0092; G01N 35/0099; G01N 35/025; G01N 35/1004; G01N 35/1065; G01N 37/00; G06T 220/10056; G06T 7/001; G06T 15/205; G06T 19/20; G06T 2200/24; G06T 2207/10068; G06T 2207/10101; G06T 2207/20028; G06T 2207/30021; G06T 2207/30101; G06T 2207/30168; G06T 2207/30242; G06T 5/002; G06T 7/0012; G06T 7/11; G06T 7/136; G06T 7/174
See application file for complete search history.

(56) References Cited

U.S. PATENT DOCUMENTS

| | | | |
|---|---|---|---|
| 2005/0012894 A1* | 1/2005 | Ketelson | G01N 13/02 351/159.33 |
| 2009/0161099 A1* | 6/2009 | Weldon | G01N 21/88 356/244 |
| 2010/0129181 A1* | 5/2010 | Blasiak | B25J 13/087 414/800 |
| 2014/0087452 A1* | 3/2014 | Liu | G01N 33/5304 422/69 |
| 2014/0307942 A1* | 10/2014 | Yu | G01N 21/958 382/141 |
| 2020/0355626 A1* | 11/2020 | Smorgon | H04N 23/56 |
| 2021/0080347 A1* | 3/2021 | Pfaff | G01M 11/0207 |

FOREIGN PATENT DOCUMENTS

| | | | | |
|---|---|---|---|---|
| EP | 0604174 A2 | | 6/1994 | |
| EP | 2131174 A2 | * | 12/2009 | ........ G01M 11/0235 |
| EP | 3213908 A1 | * | 9/2017 | ............ B29C 33/70 |
| EP | 3059575 B1 | * | 11/2020 | ........ G01M 11/0278 |
| JP | 3581314 B2 | * | 10/2004 | ........ G01M 11/0207 |
| KR | 20040081710 A | * | 9/2004 | |
| WO | 9926052 A2 | | 5/1999 | |
| WO | WO-9926052 A2 | * | 5/1999 | ........ G01M 11/0207 |
| WO | WO-2006105183 A1 | * | 10/2006 | ........... B29C 59/103 |
| WO | WO-2013169211 A1 | * | 11/2013 | ........ G01M 11/0214 |
| WO | WO-2015174927 A1 | * | 11/2015 | ........ G01M 11/0214 |

OTHER PUBLICATIONS

International Search Report and Written Opinion received for Application No. PCT/IB2022/053918, dated Jul. 7, 2022, 14 pages.

* cited by examiner

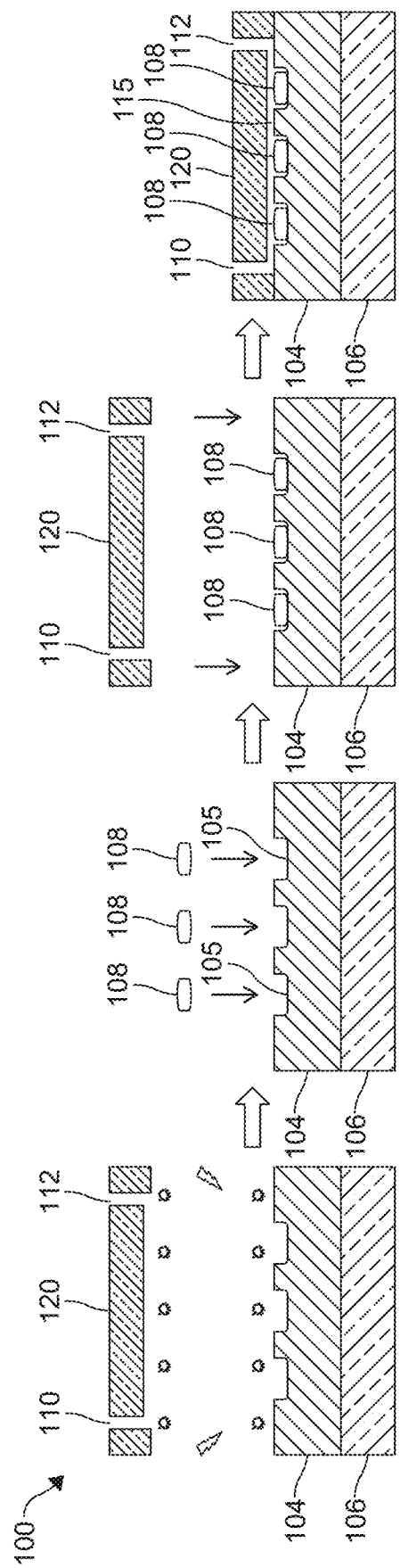

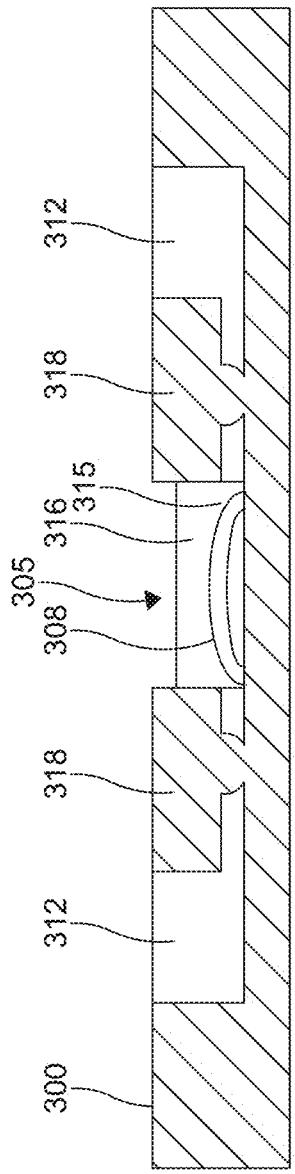
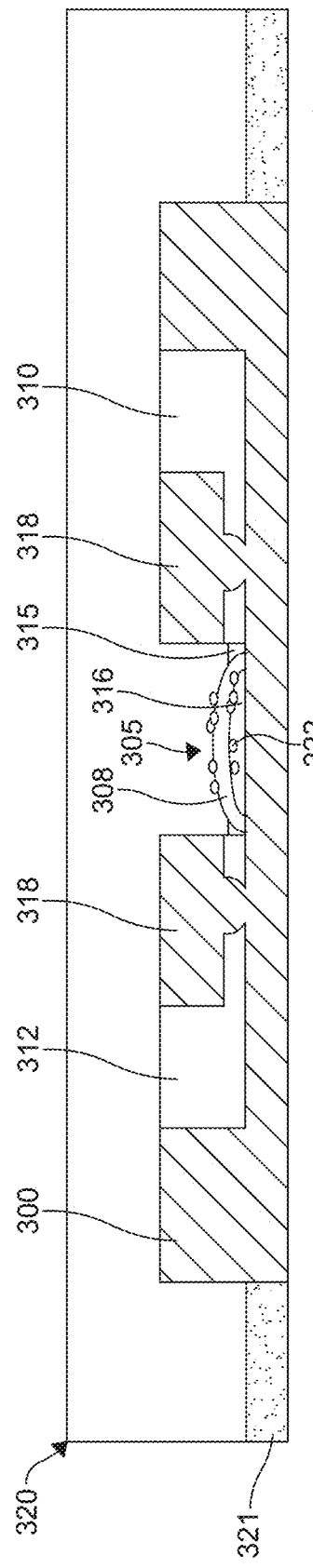
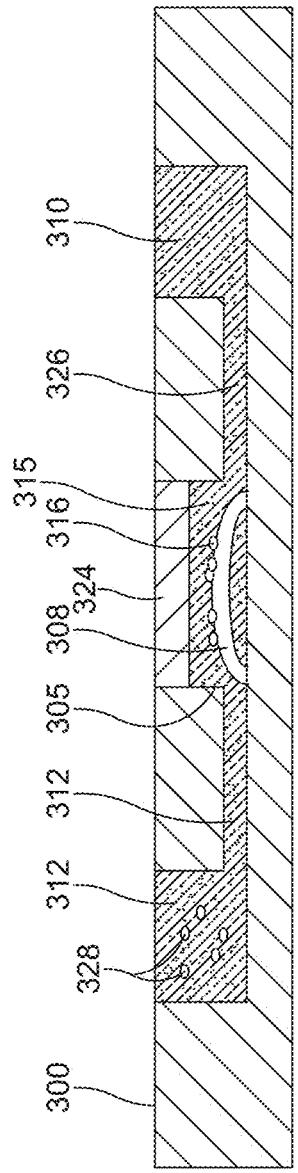

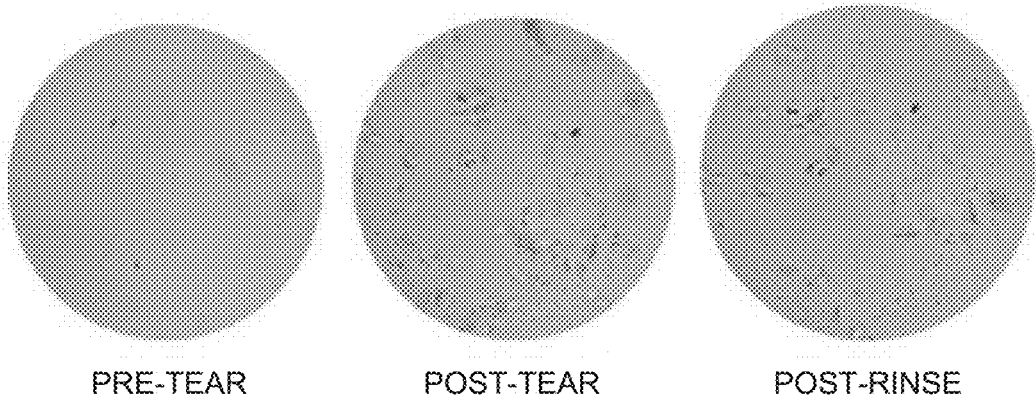
KC 1 - FRONT SURFACE
PRE-TEAR    POST-TEAR    POST-RINSE
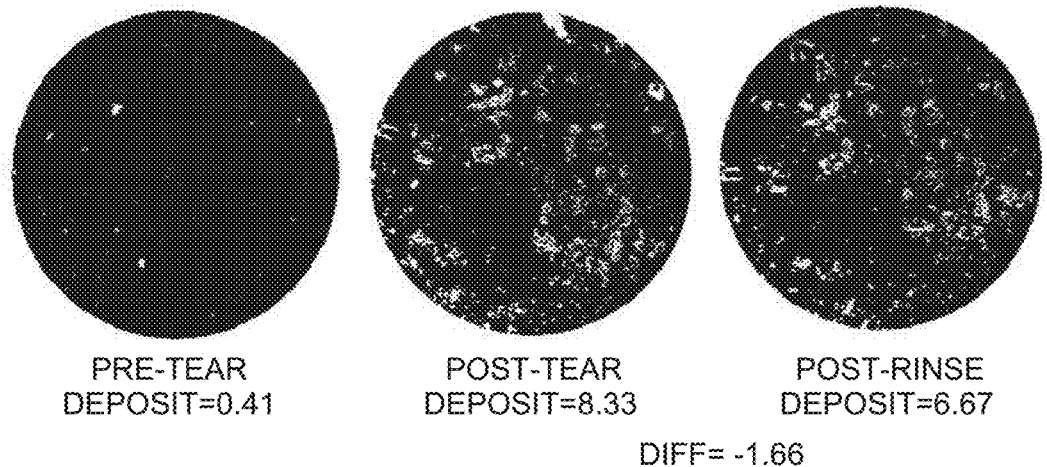
KC 1 - FRONT SURFACE
PRE-TEAR  POST-TEAR  POST-RINSE
DEPOSIT=0.41  DEPOSIT=8.33  DEPOSIT=6.67
DIFF= -1.66
FIG. 7A BL 1 - FRONT SURFACE
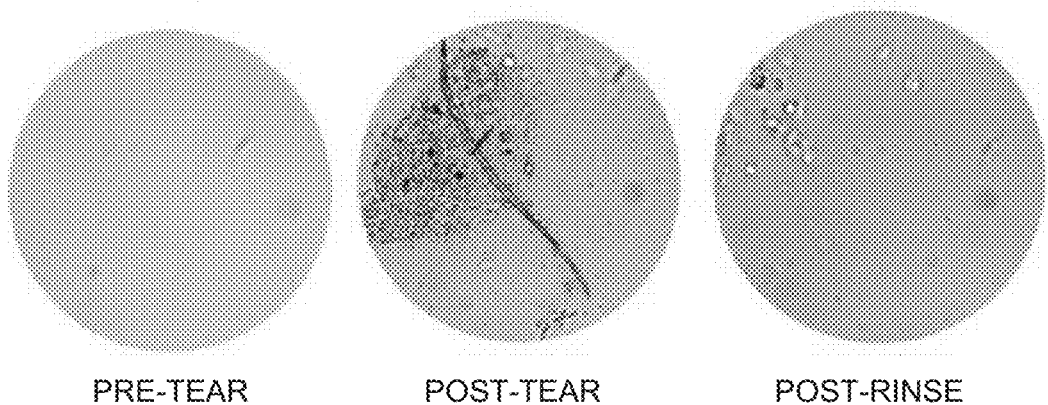
PRE-TEAR   POST-TEAR   POST-RINSE
BL 1 - FRONT SURFACE
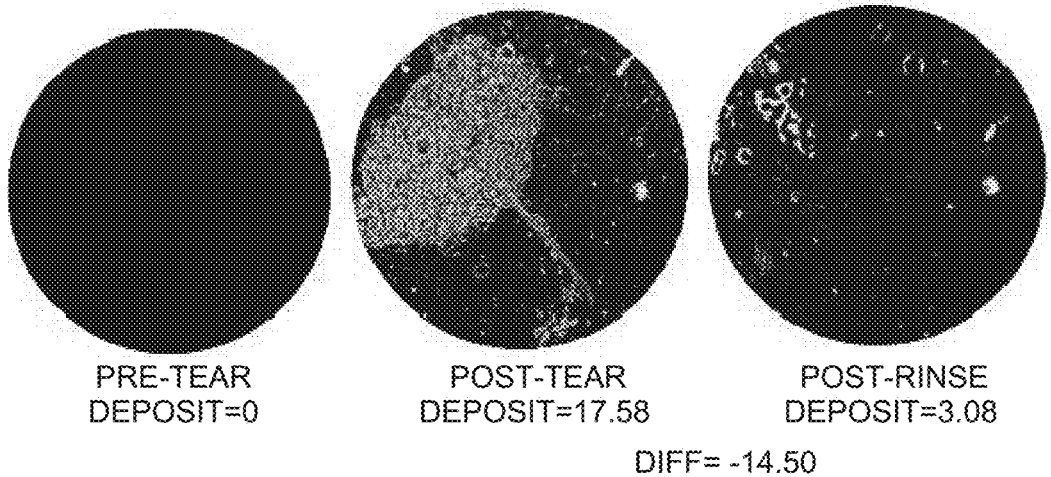
PRE-TEAR          POST-TEAR            POST-RINSE
DEPOSIT=0         DEPOSIT=17.58        DEPOSIT=3.08
                         DIFF= -14.50
FIG. 7B

MICROFLUIDIC DEVICE AND METHOD FOR QUANTIFYING CONTACT LENS DEPOSITION

BACKGROUND

Contact lens discomfort (CLD) is a common problem, with up to half of contact lens wearers experiencing CLD with some frequency or magnitude. Studies have reported that between 12% and 51% of lens wearers "drop out" of contact lens wear, with CLD being the primary reason for discontinuation. Improvements are needed.

SUMMARY

Disclosed herein are methods, systems, and devices for quantifying contact lens deposition. The disclosure relates to methods using a microfluidic chip comprising a well in fluid communication with a fluid conduit. The fluid conduit may be in selective communication with a fluid inlet and a fluid outlet to control passage of fluid through the fluid conduit and into the well.

An example method may comprise disposing a contact lens sample in the well of the microfluidic chip. The example method may comprise disposing a first volume of first fluid in the well with the contact lens sample. The example method may comprise capturing first images of the contact lens sample. The example method may comprise causing evaporation of at least a portion of the first volume of the first fluid. The example method may comprise disposing a second volume of second fluid in the well with the contact lens sample. The example method may comprise causing evaporation of at least a portion of the second volume of the second fluid. The example method may comprise disposing the microfluidic chip in a humidity chamber for a time period. The example method may comprise capturing second images of the contact lens sample after the time period has expired. The example method may comprise rinsing the contact lens sample with a third fluid. The example method may comprise capturing third images of the contact lens after the rinsing. The example method may comprise determining, using one or more of the first images, the second images, or the third images, a deposition metric. The example method may comprise outputting the deposition metric.

The microfluidic chip may comprise hydrophilic material. One or more of the well or the fluid conduit may be configured to be hydrophilic. The contact lens sample may comprise a 1 mm lens coupon. The first fluid may comprise water. The first fluid may consist essentially of water. The first fluid may consist of water. The first volume may be less than 1 µL. The first volume may be about 0.5 µL. The causing evaporation of at least a portion of the first volume of the first fluid may comprise allowing for passive evaporation. The first images may comprise an optical microscopic image of the contact lens sample. The first images may comprise an optical microscopic image of a first side and a second opposite side of the contact lens sample.

The second fluid may comprise tear fluid. The second fluid may consist essentially of tear fluid. The second fluid may consist of tear fluid. The second volume may be less than 1 µL. The second volume may be about 0.5 µL. The causing evaporation of at least a portion of the second volume of the second fluid may comprise allowing for passive evaporation. The second images may comprise an optical microscopic image of the contact lens sample. The second images may comprise an optical microscopic image of a first side and a second opposite side of the contact lens sample. The time period may be about 20 minutes.

The third fluid may comprise multipurpose solution. The third fluid may consist essentially of multipurpose solution. The third fluid may consist of multipurpose solution. The third images may comprise an optical microscopic image of the contact lens sample. The third images may comprise an optical microscopic image of a first side and a second opposite side of the contact lens sample. The deposition metric may comprise a normalized deposit area intensity. The deposition metric may comprise a normalized deposit area intensity before the rinsing. The deposition metric may comprise a normalized deposit area intensity after the rinsing. The deposition metric may comprise a difference between a deposit area intensity before the rinsing and a deposit area intensity after the rinsing.

Disclosed herein are methods for quantifying contact lens deposition using a microfluidic chip comprising a well in fluid communication with a fluid conduit. The fluid conduit may be in selective communication with a fluid inlet and a fluid outlet to control passage of fluid through the fluid conduit and into the well. An example method may comprise disposing a contact lens sample in the well of the microfluidic chip. The example method may comprise capturing a pre-tear image of the contact lens sample. The example method may comprise disposing a volume of tear fluid in the well with the contact lens sample. The example method may comprise capturing tear images of the contact lens sample. The example method may comprise rinsing the contact lens sample. The example method may comprise capturing post-rinse images of the contact lens after the rinsing. The example method may comprise determining, using one or more of the pre-tear images, the tear images, or the post-rinse images, a deposition metric. The example method may comprise outputting the deposition metric.

Disclosed herein are methods for quantifying contact lens deposition using a microfluidic chip comprising a well in fluid communication with a fluid conduit. The fluid conduit may be in selective communication with a fluid inlet and a fluid outlet to control passage of fluid through the fluid conduit and into the well. An example method may comprise disposing a contact lens sample in the well of the microfluidic chip. The example method may comprise disposing a volume of tear fluid in the well with the contact lens sample. The example method may comprise capturing pre-rinse images of the contact lens sample. The example method may comprise rinsing the contact lens sample. The example method may comprise capturing post-rinse images of the contact lens after the rinsing. The example method may comprise determining, using one or more of the tear images or the post-rinse images, a deposition metric. The example method may comprise outputting the deposition metric.

Disclosed herein are methods for quantifying contact lens deposition. An example method may comprise disposing a contact lens sample in a fluid well. The example method may comprise disposing a volume of tear fluid in the well with the contact lens sample. The example method may comprise capturing pre-rinse images of the contact lens sample. The example method may comprise rinsing the contact lens sample. The example method may comprise capturing post-rinse images of the contact lens after the rinsing. The example method may comprise determining, using one or more of the tear images or the post-rinse images, a deposition metric. The example method may comprise outputting the deposition metric.

Disclosed herein are methods for evaluating a contact lens wearer's compatibility with a lens material. An example method may comprise exposing a contact lens sample to a volume of tear fluid from the wearer. The example method may comprise capturing pre-rinse data of the contact lens sample. The example method may comprise rinsing the contact lens sample. The example method may comprise capturing post-rinse data of the contact lens sample after the rinsing. The example method may comprise comparing the pre-rinse data with the post-rinse data.

BRIEF DESCRIPTION OF THE DRAWINGS

The following drawings show generally, by way of example, but not by way of limitation, various examples discussed in the present disclosure. In the drawings:

FIG. 1A shows an example microfluidic chip fabrication process.

FIGS. 3A-3C show an example schematic of the microfluidic device for contact lens deposition quantification.

FIG. 7A shows example contact lens coupon images in the microfluidic well and an example computer-processed images with deposition score.

FIG. 7B shows an example contact lens coupon images in the microfluidic well and an example computer-processed images with deposition score.

DETAILED DESCRIPTION

Lens surface build-up (deposition) may be a factor in determining lens-wear comfort and success. Therefore, there is considerable interest in easy-to-use methods and devices for reproducing, detecting, and quantifying lipid/protein deposition on contact lens suitable at clinical settings.

Described herein are microfluidic devices (including device design, manufacture, test, and usage) and methods for quantifying contact lens deposition using µL or sub-µL human tears and small contact lens coupons.

Microfluidic Device

Described herein is a microfluidic (e.g., lab-on-a-chip) system and method to evaluate the interaction between contact lens and tear, which may enable the reproduction and quantification of tear deposits on small contact lens samples. The microfluidic device may be made of polydimethylsiloxane (PDMS), polystyrene, acrylic, cyclic olefin copolymer (COC), etc. by injection molding, replication molding, milling or lithography.

Systems and devices of the present disclosure may comprise or be embodied as a lab-on-a-chip system including fluid source, pressure sources (and associated pneumatic components), and further including, one or more of: fluid handling (e.g., solution handling and flow control, reagent handling, sample handling, power supply/generation (e.g., port for power input, integrated battery, and/or the like), system control (e.g., a processor/microprocessor, a memory, electrical and pneumatic communication lines, and/or the like), communication (e.g., wired communication, wireless communications such as via Bluetooth), and/or the like.

Example Microfluidic Chip Fabrication

Figure 1B:
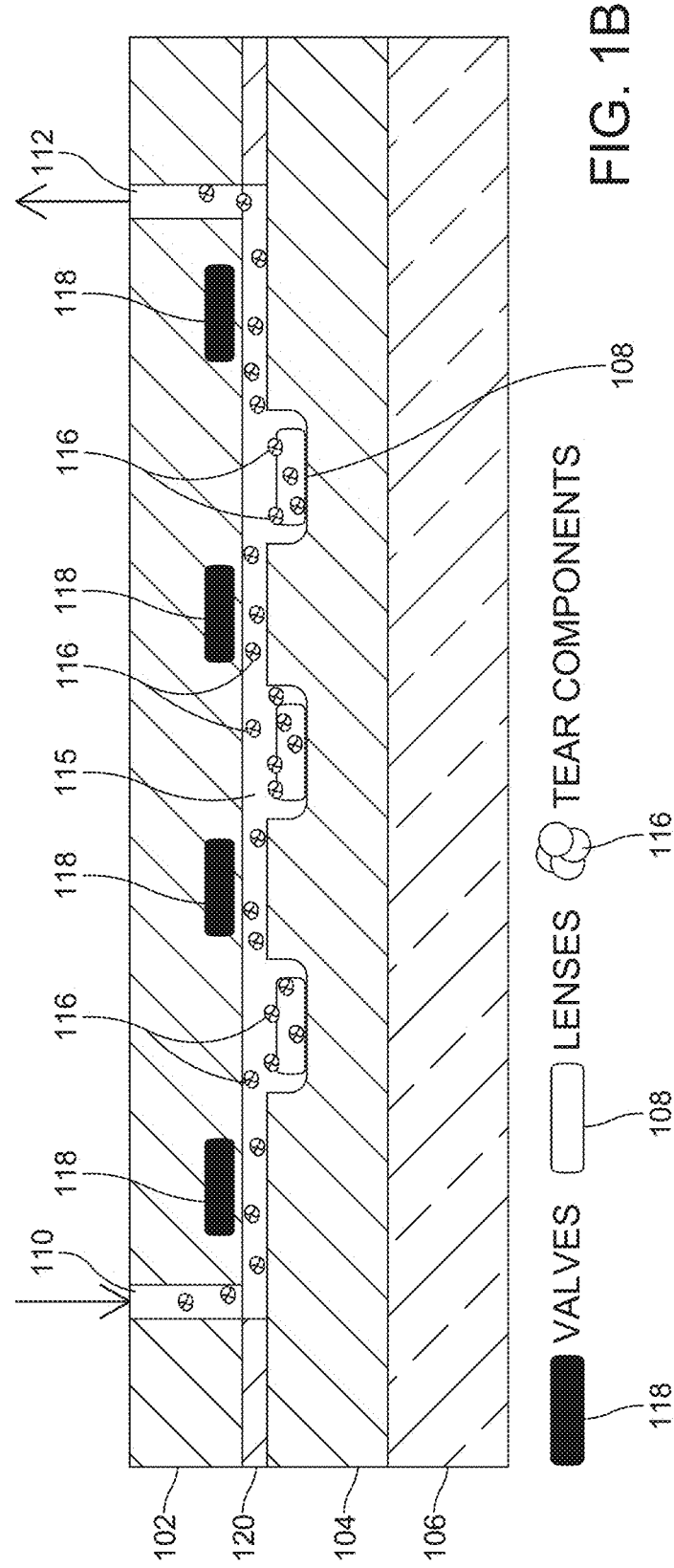
FIG. 1B shows an example image of a fully assembled chip and an example schematic of inset.

FIG. 1A shows an example microfluidic chip fabrication process. FIG. 1B shows an example schematic of inset of a fully assembled chip. As shown, a microfluidic chip 100 may comprise one or more layers. As an example, the microfluidic chip 100 may comprise one or more of a fluidic layer 120, a well layer 104, or a substrate 106 (e.g., glass slide), or any combination thereof. The well layer 104 may be disposed on the substrate 106. The well layer 104 may be interposed between the fluidic layer 120 and the substrate 106. The fluidic layer 120 may comprise polydimethylsiloxane (PDMS). However other materials may be used, such as, but not limited to polystyrene, cyclic olefin copolymer (COC), acrylic, polyurethane, polypropylene, polycarbonate, or glass, or a combination thereof. The well layer 104 may comprise polydimethylsiloxane (PDMS). However other materials may be to form one or more of the layers 120, 104, 106, such as polystyrene, cyclic olefin copolymer (COC), acrylic, polyurethane, polypropylene, polycarbonate, or glass, or a combination thereof The well layer 104 may comprise one or more wells 105 configured to receive a material such as fluid and/or sample test materials (e.g., sample contact lens). The one or more wells 105 may be configured to retain a volume of fluid therein. The one or more wells 105 may be configured to receiver one or more samples such as a contact lens sample 108. The contact lens sample may be or comprise a contact lens or a portion (e.g., coupon) of a contact lens. As an example, one or more of the wells 105 may be sized to receive the contact lens sample 108 or a portion of a contact lens sample 108. One or more of the wells 105 may be sized to retain the contact lens sample 108 or a portion of the contact lens sample 108.

The fluidic layer 120 (and/or a control layer 102 (FIG. 1B)) may comprise an inlet 110 and an outlet 112. The inlet 110 may be defined by an orifice that allows passage of a fluid therethrough. The outlet 112 may be defined by an orifice that allows passage of a fluid therethrough. When the microfluidic chip 100 is assembled, the inlet 110 may be in fluid communication with the outlet 112 via a fluid conduit 115 or passage. The fluid conduit 115 may be at least partially formed in or defined by one or more of the control layer 102 (FIG. 1B), fluidic layer 120, or the well layer 104. The fluid conduit 115 may be defined by at least a portion of one or more of the fluidic layer 120 or the well layer 104.

As an example, the well layer 104 may be disposed on the substrate 106. One or more surfaces of the well layer 104 and/or the fluidic layer 120 may be plasma treated. One or more contact lens samples 108 may be disposed in respective wells 105. The fluidic layer 120 may be aligned with the well layer 104 and sealed against the well layer 104 such that the inlet 110 and outlet 112 are in fluid communication with the one or more wells 105 (e.g., via the fluid conduit 115).

FIG. 1B illustrates the assembled microfluidic device 100. As shown, the well layer 104 is disposed on the substrate 106. A contact lens sample 108 is disposed in each of the wells 105 of the well layer 104. The fluidic layer 120 is disposed on the well layer 104 and defines the fluid conduit 115 in fluid communication between the wells 105 of the well layer 104 and the inlet 110 and outlet 112 of the fluidic layer 120. The fluid layer 120 may be interposed between the well layer 104 and a control layer 102, or may be formed as part of the control layer 102).

One or more fluids (e.g., tear fluid, multipurpose fluid) may be caused to pass through the fluid conduit 115 (e.g., via the inlet 110 and toward the outlet 112). As an illustrative example, tear components 116 are shown passing over the contact lens samples 108 in the wells 105. As such, deposition may occur on the contact lens samples 108, which may be tested using the systems, devices, and methods of the present disclosure. As an example, one or more valves 118 (e.g. in the control layer 102) may be configured to control flow of fluid in the fluid conduit 115 and between one or more of the wells 105.

As a non-limiting example, to fabricate the well layer 104, RTV615 (PDMS) from R.S. Hughes (Sunnyvale, Calif.) or Sylgard 184 was mixed at a ratio of 10:1 (A:B), poured onto the well mold, degassed, and baked for 90 minutes in a 75° C. oven. After curing, the PDMS was peeled off the mold, cut into small squares, and bonded to a glass slide with air plasma (Electro-Technic Products, BD-20AC). To fabricate the control layer 102, RTV615 was mixed at a ratio of 5:1, poured onto the mold, degassed, and par-baked for 1 hour. To fabricate the fluidic layer 120, RTV615 was mixed at a ratio of 20:1, spun onto the mold at 1100 RPM, and par-baked for 1 hour. The control layer 102 was then peeled off the mold, cut into small squares, aligned on top of the fluidic layer 120 mold, and baked for another hour before lifting off and baking overnight. Inlet/outlet ports were cored using a 0.75 mm biopsy punch. Small (1 mm diameter) contact lens samples were cored from a full-size contact lens hydrogel using a biopsy punch. To assemble the chip, the top microfluidic layers (fluidic layer 120 and control layer 102) and the bottom well layer 104 were plasma treated, lens samples were placed into the wells, and the two PDMS pieces were aligned and sealed followed by a 10-minute bake at 75° C.

As a further example, three master molds (fluidic, control, and wells) were fabricated using standard photolithography on 3 inch silicon wafers. For both fluidic 120 and control 102 layers, AZ 9260 was spun at 900 RPM, soft-baked at 110° C. for 5 minutes, rehydrated for 30 minutes, exposed at 1800 mJ/cm2, developed for 5 minutes in a AZ 400K 1:3 developer, and reflowed at 130° C. for 1 minute (H=19 µm). For the well layer 104, SU-8 2150 was spun to a thickness of 230 µm, soft-baked at 95° C. for 1 hour, exposed at 1480 mJ/cm2 with long pass filter (PL-360-LP), post-exposure baked at 95° C. for 20 minutes, developed in a SU-8 developer for 20 minutes, and hard-baked at 155° C. for 5 minutes.

Example Microfluidic Chip Operation with 1 µL Samples and 1 mm Diameter Lens

Example Capillary Driven Flow

Figure 2:
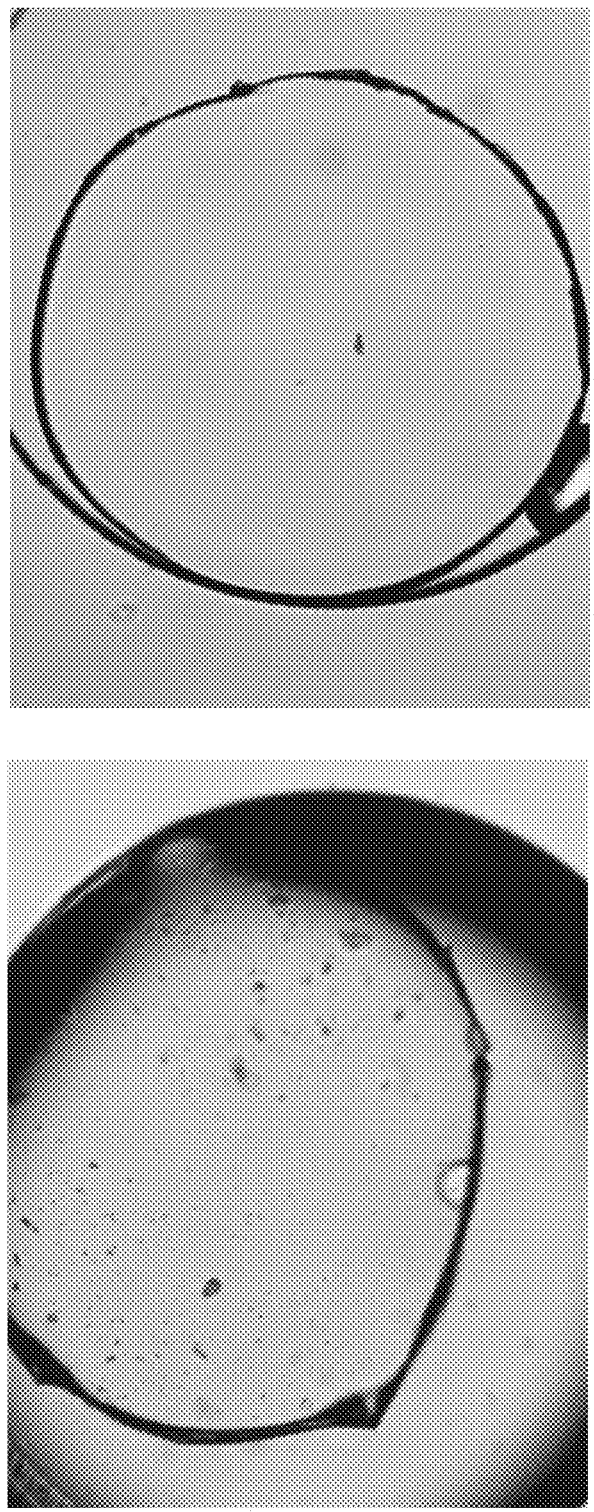
FIG. 2 shows an example micrograph of a 1 mm diameter contact lens in a 1.5 mm diameter microfluidic well on a Polydimethylsiloxane-Polyethylene oxide (PDMS-PEO) microfluidic chip and an example optical micrograph of a 1 mm diameter contact lens in a 1.2 mm diameter microfluidic well.

To simplify the setup and increase the throughput, the microfluidic chip was modified to make it hydrophilic by mixing PDMS with PDMS-PEO (1%). With such hydrophilic chips, tear samples may be dropped onto the well or pipetted into the inlet, then the tear samples may flow to the lens sample area without active pumping. FIG. 2 shows a 1 mm diameter example lens in a 1.5 mm diameter microfluidic well. 1 µL PBS solution was introduced into the well.

FIG. 2 shows an example colored micrograph of a 1 mm diameter example lens in a 1.5 mm diameter microfluidic well on a PDMS-PEO microfluidic chip (left) and gray-scale optical micrograph of a 1 mm diameter example lens in a 1.2 mm diameter microfluidic well (right).

Example Pressure Driven Flow

To automate the microfluidic chip operation, liquid sample may be introduced by inserting a micropipette tip into the inlet (e.g., inlet 110 (FIG. 1)), or dropping the sample into the inlet port and applying a pressure of 1 psi. Such pressure driven microfluidic flow may be automated and controlled by using on-chip valves and pumps, and a portable controller.

Example Deposition Testing

FIGS. 3A-3C show example schematic side views of an example microfluidic chip 300 at different steps during an example deposition testing process. The microfluidic chip 300 may comprise a main body having a fluid conduit 315 formed therein. The fluid conduit 315 may extend between an inlet 310 and an outlet 312. The fluid conduit 315 may be in fluid communication with one or more wells 305. As an example, one or more valves 318 may be configured to control a flow of fluid through the fluid conduit 315. As a further example, the one or more valves 318 may be configured to control a flow or retention of fluid over or in the one or more wells 305.

FIG. 3A shows a contact lens sample 308 disposed in the well 305. The contact lens sample 308 may comprise a contact lens or a portion thereof. A tear fluid 316 may be disposed in the well 305 and/or on or around the lens sample 308. FIG. 3B shows the microfluidic chip 300 disposed in a humidity chamber 220. The humidity chamber 220 may comprise a fluid 221 and may be configured to maintain a target humidity and/or temperature. As such, the microfluidic chip 300 may emulate an on-eye environment. As an example, the tear fluid 316 may leave deposits 222 on the lens sample 308. FIG. 3C shows a cover 224 disposed over the well to enclose the well 305 and to allow fluid to pass through the fluid conduit 315 without exiting through the well 305. A fluid 226 such as a rinse or multipurpose solution may be caused to pass through the fluid conduit 315 from the inlet 310 through the well 305 and toward the outlet 312. The fluid 226 may rinse at least a portion of the deposits 222 off the lens sample 308 as waste 228.

As an illustrative example, a 1 mm diameter lens coupon may be placed in the open reaction chamber (1.2 mm diameter). Pure water may be added to the chamber. Pre-tear optical microscope images of the lens may be taken. The on-chip valves may be closed to confine the tear in the chamber region. A 0.5 µL tear sample may be dropped onto the lens. The chamber may be left open for ~10 minute to allow the tear to evaporate. The microfluidic chip may be placed in a humidity chamber at 37° C. for another 20 minutes. A removable cover may be placed on the chamber to close the chip for automated washing and processing. The optical microscope images of the lens may be taken at this point (post tear). The on-chip valves may be open and multipurpose solution may be pushed into the chamber to wash the lens. Post rinse optical microscope images may be taken.

Figure 4:
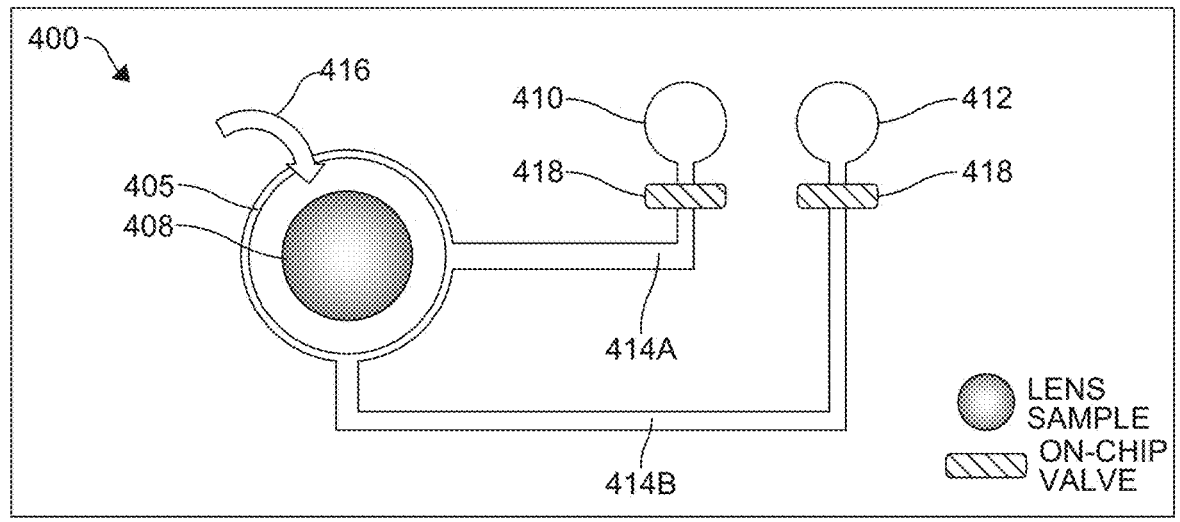
FIG. 4 shows an example implementation of the microfluidic device using on-chip microvalves and electronically controlled pressure-driven liquid flow.
Figure 5:
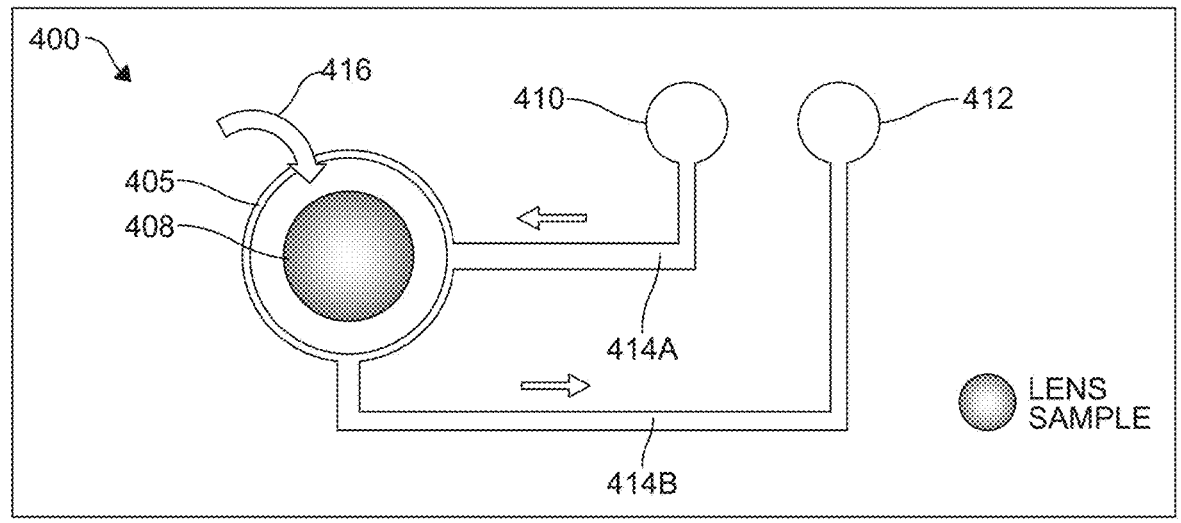
FIG. 5 shows an example implementation of the microfluidic device using capillary driven liquid flow.

FIGS. 4-5 show an example implementation of a microfluidic device 400 using on-chip microvalves 418 and electronically controlled pressure-driven liquid flow. As shown, the microfluidic device 400 comprises an inlet 410 in fluid communication with an outlet 412 via a fluid conduit 414A, 414B. The fluid conduits 414A, 414B are configured in fluid communication with a well 405. The well 405 is configured to receive a contact lens sample 408, a fluid such as tear fluid 416, or a combination of both. One or more valves 418 may be configured to control a flow of fluid through the conduits 414A, 414B, or the well 405, or both. As shown in FIG. 5, when the valves 418 are open, fluid may flow from the inlet 410 through the well 405 and toward the outlet 412.

A method for quantifying contact lens deposition using a microfluidic chip (e.g., microfluidic chip 100 (FIG. 1), microfluidic chip 300 (FIG. 3)) may comprise one or more of the following:

1) disposing a contact lens sample in the well of the microfluidic chip; disposing a first volume of first fluid in the well with the contact lens sample;
2) capturing first images of the contact lens sample;
3) causing evaporation of at least a portion of the first volume of the first fluid;
4) disposing a second volume of second fluid in the well with the contact lens sample;
5) causing evaporation of at least a portion of the second volume of the second fluid; disposing the microfluidic chip in a humidity chamber for a time period;
6) capturing second images of the contact lens sample after the time period has expired;
7) rinsing the contact lens sample with a third fluid; capturing third images of the contact lens after the rinsing;
8) determining, using one or more of the first images, the second images, or the third images, a deposition metric; and
9) outputting the deposition metric.

Figure 6A:
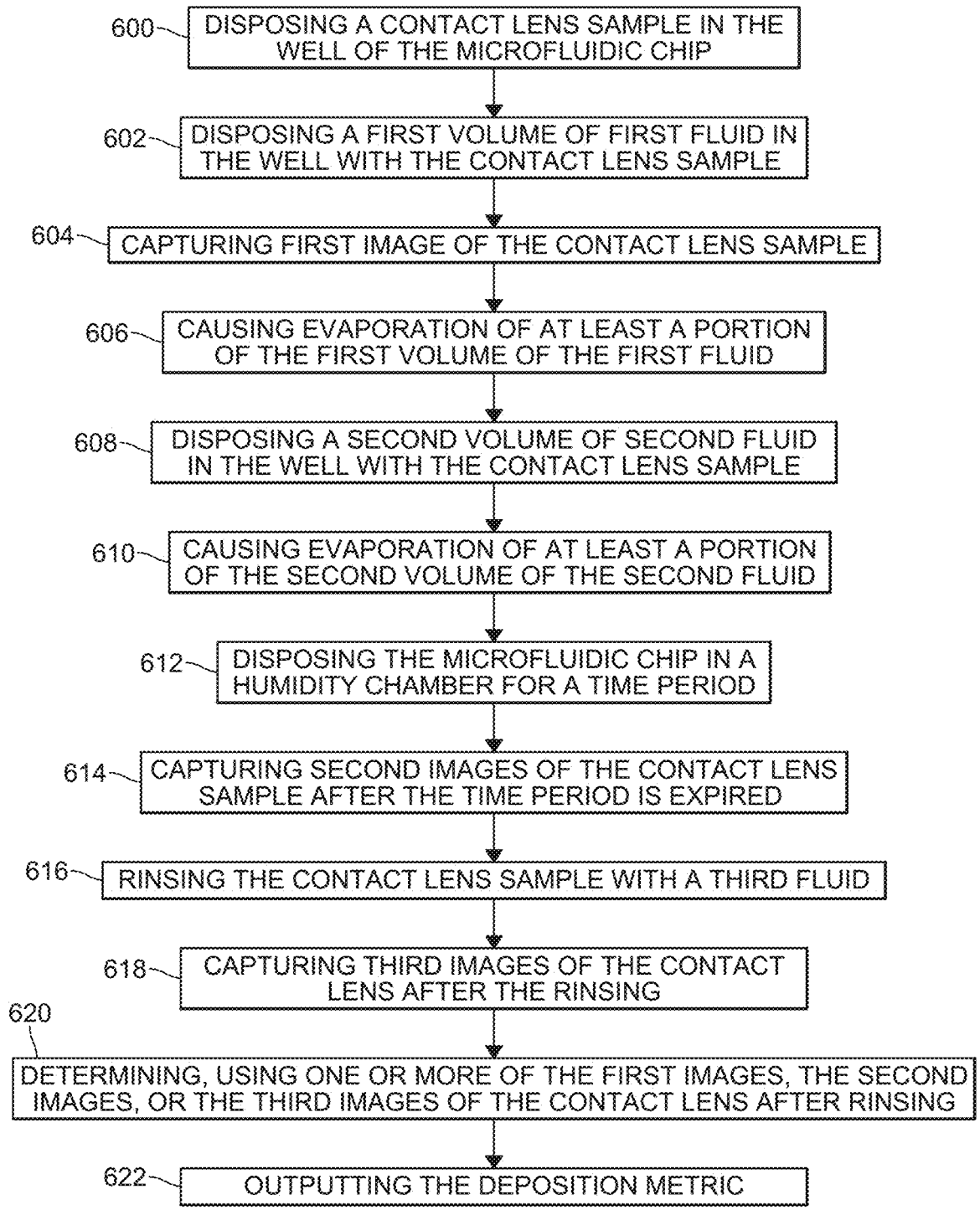
FIG. 6A shows an example method flow diagram.

FIG. 6A illustrates an example method for quantifying contact lens deposition using a microfluidic chip (e.g., microfluidic chip 100 (FIG. 1), microfluidic chip 300 (FIG. 3)). The method shown in FIG. 6A may use a microfluidic chip comprising a well in fluid communication with a fluid conduit, wherein the fluid conduit is in selective communication with a fluid inlet and a fluid outlet to control passage of fluid through the fluid conduit and into the well. The method shown in FIG. 6A may comprise one or more of the steps 600-622.

At 600, a contact lens sample may be disposed in the well of the microfluidic chip. The contact lens sample may be or comprise a whole or part of a contact lens, such as a soft contact ophthalmic lens. The contact lens sample may be sized based on a size of the well. The contact lens sample may be or comprise a 1 mm lens coupon. As an example, the microfluidic chip comprises hydrophilic material. As a further example, one or more of the well or the fluid conduit is configured to be hydrophilic. As yet a further example, multiple different types of contact lens coupons or materials may be pre-loaded in the microfluidic chip during the manufacturing processing.

At 602, a first volume of first fluid may be disposed in the well with the contact lens sample. As an example, the first fluid may be or comprise water. The first fluid may consist essentially of water. The first fluid may consist of water. The first volume may be based on a volume of the well. The first volume may be less than 1 µL. The first volume may be about 0.5 µL. The first volume may be between 0.3 µL and 3 µL.

At 604, one or more first images of the contact lens sample may be captured. The one or more first images may comprise an optical microscopic image of the contact lens sample. The one or more first images may comprise an optical microscopic image of a first side and a second opposite side of the contact lens sample. The one or more first images may be bright-field, dark-field, phase-contrast, differential interference contrast (DIC) or fluorescent microscope images, or a combination thereof.

At 606, at least a portion of the first volume of the first fluid in the well may be caused to evaporate. Such evaporation may be passive or active.

At 608, a second volume of second fluid may be disposed in the well with the contact lens sample. The second fluid may be or comprise tear fluid. The second fluid may consist essentially of tear fluid. The second fluid may consist of tear fluid. The second volume may be less than 1 µL. The second volume may be about 0.5 µL. The second volume may be between 0.3 µL and 3 µL.

At 610, at least a portion of the second volume of the second fluid may be caused to evaporate. Such evaporation may be passive or active.

At 612, the microfluidic chip may be disposed in a humidity chamber for a time period. The time period may be about 20 minutes. The time period may be 10-20 minutes. The time period may be 15-20 minutes. The time period may be adjusted to effect target conditions.

At 614, one or more second images of the contact lens sample may be captured after the time period has expired. The one or more second images may comprise an optical microscopic image of the contact lens sample. The one or more second images may comprise an optical microscopic image of a first side and a second opposite side of the contact lens sample.

At 616, the contact lens sample may be rinsed with a third fluid. The third fluid may be or comprise multipurpose solution. The third fluid may consist essentially of multi-purpose solution. The third fluid may consist of multipurpose solution. The third fluid may be or comprise pure water, phosphate-buffered saline (PBS) solution, or other contact lens cleaning liquids.

At 618, one or more third images of the contact lens may be captured after the rinsing. The one or more third images may comprise an optical microscopic image of the contact lens sample. The one or more third images may comprise an optical microscopic image of a first side and a second opposite side of the contact lens sample.

At 620, a deposition metric may be determined. Determining the deposition metric may be implemented using one or more of the first images, the second images, or the third images. The deposition metric may comprise a normalized deposit area intensity. The deposition metric may comprise a normalized deposit area intensity before the rinsing. The deposition metric may comprise a normalized deposit area intensity after the rinsing. The deposition metric comprises a difference between a deposit area intensity before the rinsing and a deposit area intensity after the rinsing.

At 622, the deposition metric may be outputted. Such output may be via a user interface.

Figure 6B:
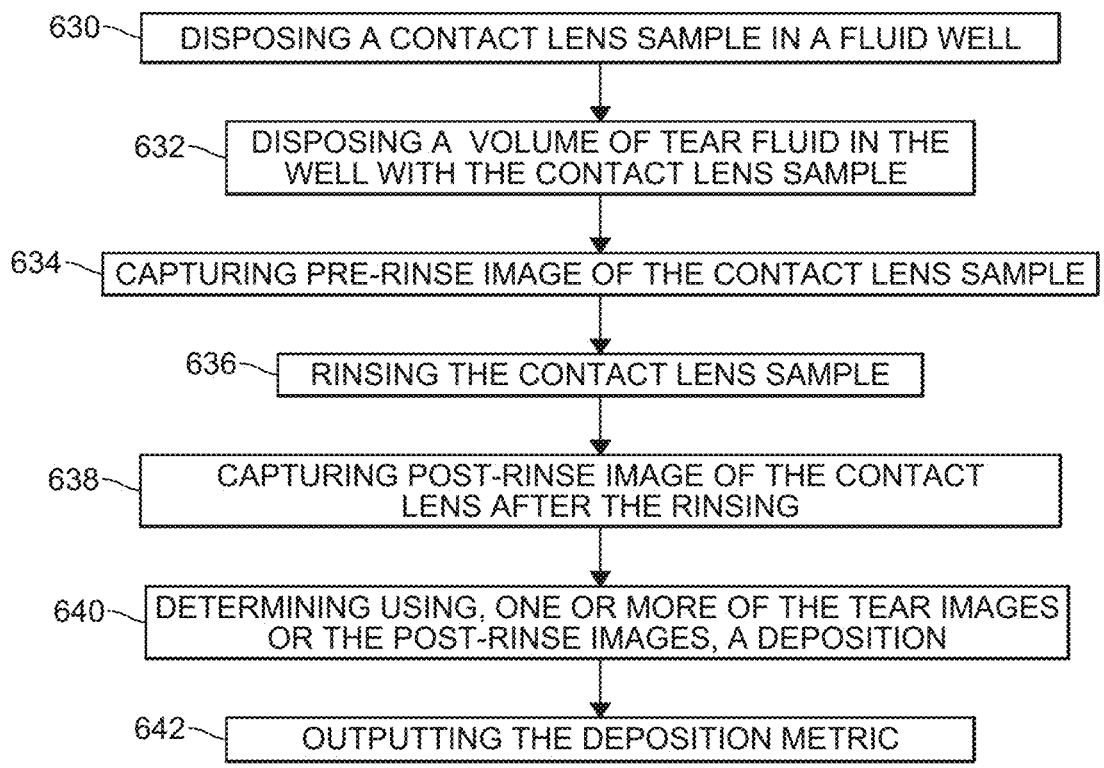
FIG. 6B shows an example method flow diagram.

FIG. 6B illustrates an example method for quantifying contact lens deposition using a microfluidic chip (e.g., microfluidic chip 100 (FIG. 1), microfluidic chip 300 (FIG. 3)). The method shown in FIG. 6B may be implemented using a microfluidic chip comprising a well in fluid communication with a fluid conduit, wherein the fluid conduit is in selective communication with a fluid inlet and a fluid outlet to control passage of fluid through the fluid conduit and into the well. The method shown in FIG. 6B may comprise one or more of the steps 630-642.

At 630, a contact lens sample may be disposed in the well of the microfluidic chip. The contact lens sample may be or comprise a whole or part of a contact lens, such as a soft contact ophthalmic lens. The contact lens sample may be sized base on a size of the well. The contact lens sample may be or comprise a 1 mm lens coupon. As an example, the microfluidic chip comprises hydrophilic material. As a further example, one or more of the well or the fluid conduit is configured to be hydrophilic.

At 632, a volume of tear fluid may be disposed in the well with the contact lens sample. The volume may be less than 1 µL. The volume may be about 0.5 µL.

At 634, one or more pre-rinse images may be captured of the contact lens sample. The one or more pre-rinse images may comprise an optical microscopic image of the contact lens sample. The one or more pre-rinse images may comprise an optical microscopic image of a first side and a second opposite side of the contact lens sample.

At 636, the contact lens sample may be rinsed. The contact lens sample may be rinsed with a fluid. The fluid may be or comprise multipurpose solution. The fluid may consist essentially of multipurpose solution. The fluid may consist of multipurpose solution.

At 638, one or more post-rinse images of the contact lens after the rinsing may be captured. The one or more post-rinse images may comprise an optical microscopic image of the contact lens sample. The one or more post-rinse images may comprise an optical microscopic image of a first side and a second opposite side of the contact lens sample.

At 640, a deposition metric may be determined. Determining the deposition metric may be implemented using one or more of the pre-rinse or post-rinse images. The deposition metric may comprise a normalized deposit area intensity. The deposition metric may comprise a normalized deposit area intensity before the rinsing. The deposition metric may comprise a normalized deposit area intensity after the rinsing. The deposition metric comprises a difference between a deposit area intensity before the rinsing and a deposit area intensity after the rinsing.

At 642, the deposition metric may be outputted. Such output may be via a user interface.

Figure 6C:
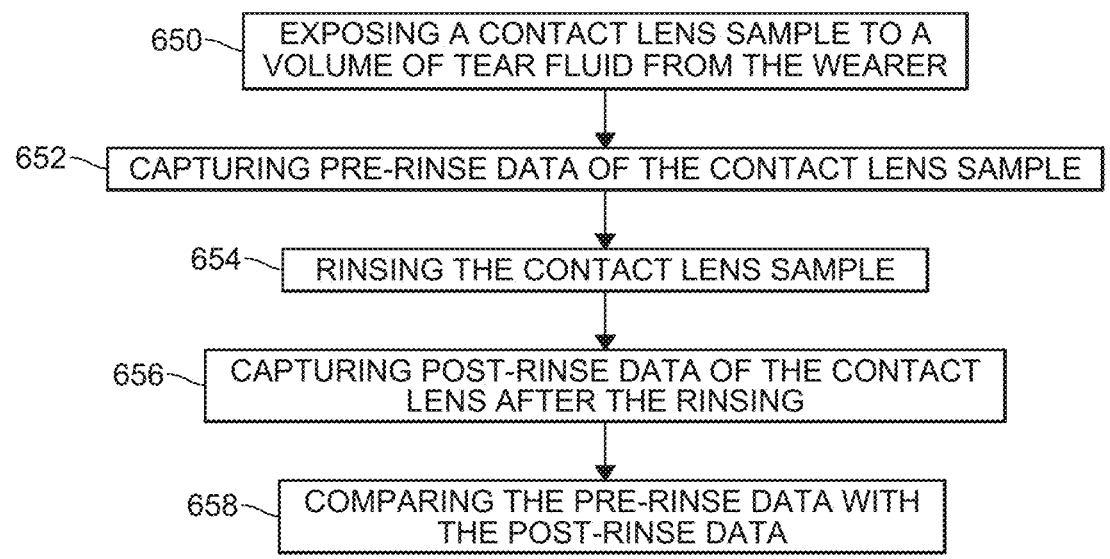
FIG. 6C shows an example method flow diagram.

FIG. 6C illustrates an example method for quantifying contact lens deposition using a microfluidic chip (e.g., microfluidic chip 100 (FIG. 1), microfluidic chip 300 (FIG. 3)). The method shown in FIG. 6C may comprise one or more of the steps 650-658.

At 650, a contact lens sample may be exposed to a volume of tear fluid from the wearer.

At 652, pre-rinse data of the contact lens sample may be captured. The pre-rinse data may comprise or be based on one or more pre-rinse images captured of the contact lens sample. The one or more pre-rinse images may comprise an optical microscopic image of the contact lens sample. The one or more pre-rinse images may comprise an optical microscopic image of a first side and a second opposite side of the contact lens sample.

At 654, the contact lens sample may be rinsed. The contact lens sample may be rinsed with a fluid. The fluid may be or comprise multipurpose solution. The fluid may consist essentially of multipurpose solution. The fluid may consist of multipurpose solution.

At 656, post-rinse data of the contact lens sample after the rinsing may be captured. The post-rinse data may comprise or be based on one or more post-rinse images captured of the contact lens sample. The one or more post-rinse images may comprise an optical microscopic image of the contact lens sample. The one or more post-rinse images may comprise an optical microscopic image of a first side and a second opposite side of the contact lens sample.

At 658, the pre-rinse data and the post-rinse data may be compared. Such comparison may comprise determining a deposition metric. The deposition metric may comprise a normalized deposit area intensity. The deposition metric may comprise a normalized deposit area intensity before the rinsing. The deposition metric may comprise a normalized deposit area intensity after the rinsing. The deposition metric comprises a difference between a deposit area intensity before the rinsing and a deposit area intensity after the rinsing.

Example Assay Protocol (Operational Procedure)

Example testing procedures may comprises one or more of the following steps.

Step 1. Centrifuge the tear at 3000 revolutions per minute (rpm) to bring the tear to the bottom of the tube.

Step 2. Add 1 millimeter (mm) lens into the microfluidic well (1.2 mm diameter, 250 micrometers (um) deep, i.e. 0.28 microliter (µL)).

Step 3. Add 0.5 µL pure water to the well; cover the well with a coverslip; and take gray-scale microscope images of front and back surfaces (pre-tear).

Step 4. Wait for a few minutes so that some of the pure water evaporates but the lens is still moist; and add 0.5 µL tear into the well.

Step 5. Wait for another 10 minutes so that some tear evaporates but the lens is still moist; put the microfluidic chip in the humidity chamber at 37° C.; wait for 20 minutes; and take gray-scale microscope images of front and back surfaces (with a coverslip and pure water) (post tear).

Step 6. Rinse lens with 0.5 µL multi-purpose solution (e.g. MPS, Revitalens) 5 times; and take gray-scale microscope images of front and back surfaces (with a coverslip and MPS solution) (post rinse).

Steps may be removed or added.

Example Computer Algorithm

One or more optical microscope images (bright-field, dark-field, fluorescent) may be processed by a computer image processing algorithm to give a quantitative number (e.g., score, etc.) based on a deposition area, intensities, fluorescent labels, morphology, the like and/or any combination of the foregoing. Example algorithm steps are given below:

1) One or more image files, such as a file arranged in Tagged Image File Format (TIFF) with a true color (red-green-blue (RGB)) baseline, may be received as input.

2) The one or more image files may be converted to a grayscale, such as 8-bit grayscale, 16-bit grayscale, etc.

3) Thresholding (e.g. Ostu or adaptive) may be applied to convert the one or more grayscale images to black & white in order to identify deposit areas.

4) A circular region (e.g., region of interest) on the lens (no lens boundary within the circle) may be selected, either manually or automatically.

5) The normalized deposit area intensities may be calculated for the selected region at both after rinse and before rinse. The normalized deposit area intensities may be calculated using the following formula: Deposit_intensity=total_deposit_area_intensity/total_area.

5) The difference in intensity between the calculated after rinse deposit intensity and the calculated before rinse deposit intensity may be calculated. The difference in intensity may be calculated using the following formula: Diff_intensity=deposit_intensity_after_rinse−deposit_intensity_before_rinse.

6) A deposition score may be calculated based on deposit area size, morphology, gray-scale intensity, fluorescent label intensities, and/or differences in such features between after-rinse and before-rinse.

Steps may be removed or added.

As an illustrative example, the following source MATLAB code may be used for image analysis and deposition quantification:

```
image_filename='KCl_postrinse.tif';
image_rgb=imread(image_filename);
% if image is a tiff using cmyk color space
image_gray=rgb2gray(image_rgb);
image_double=im2double(image_gray);
imshow(image_double);
h=drawcircle('Color','r');
mask=createMask(h);
bg_value=mean(mean(image_double));
bg=ones(size(image_double)).*(1-mask)*bg_value;
white_bg=ones(size(image_double)).*(1-mask)*255;
% imshow(bg):
image_roi=image_double.*mask;
imshow(image_roi+white_bg);
% Code below is for histogram equalization which seems not necessary
% figure
% imhist(image_gray)
% image_gray_histeq=histeq(image_gray);
% image_gray_histeq=adapthisteq(image_gray);
[level, EM]=graythresh(image_roi); % ostu's method
% level=adaptthresh(image_roi); %
image_wb=imbinarize(image_roi,level*1.8); % threshold level is 1.8 of the ostu's output
image_bw=(1-image_wb).*mask;
% for graythresh, need to use 1-image_bw
imshow((image_bw)+white_bg);
% h=drawcircle('Color','r');
% mask=createMask(h);
% imshow(image_gray, [ ]);
% show gray scale deposit intensity image
imshow((image_bw.*image_double)+white_bg);
deposit_percentage=sum(sum((image_bw).*mask))/sum(sum(mask))*100% [0 100]
deposit_intensity_normalized=sum(sum(image_double.*image_bw.*mask)/sum(sum(mask))*255% [0 255] 255 is max gray scale level for this camera
deposit_intensity=sum(sum(image_double.*image_bw.*mask))*255% [0 255]255 is max gray scale level for this camera
```

Modifications may be made to the example code. Other codes and algorithms may be used.

Example On-Chip Lens Images after Tear Deposition and Cleaning

FIG. 7A shows example contact lens coupon images in the microfluidic well (top) and example computer-processed images with deposition score (bottom). A shown, KCl is a heavy depositing tear. In particular, FIG. 7A shows bright-field optical micrographs of an example lens before any tear deposition, right after tear deposition and after rinsing with multi-purpose solution (top); and computer-processed gray-scale images with calculated deposition scores (bottom). The difference of the deposition scores between before rinse (post tear) and post rinse shows how easily the deposits may be removed by the multi-purpose solution: the larger the difference, the easier to remove the deposit. The deposition score may be calculated by summing up all the deposit pixel intensities and normalizing the sum by the lens area. The deposit pixels may be identified by applying a threshold to the gray scale image and picking the pixels with intensity higher than the threshold. The deposit pixels are shown as the bright areas in the bottom panel of FIG. 7A. FIG. 7B shows the set of images for a normal tear sample, where the top panel of FIG. 7B shows example contact lens coupon images in the microfluidic well and the bottom panel shows example computer-processed images with deposition score; as shown, BL1 is a normal tear.

Figure 8:
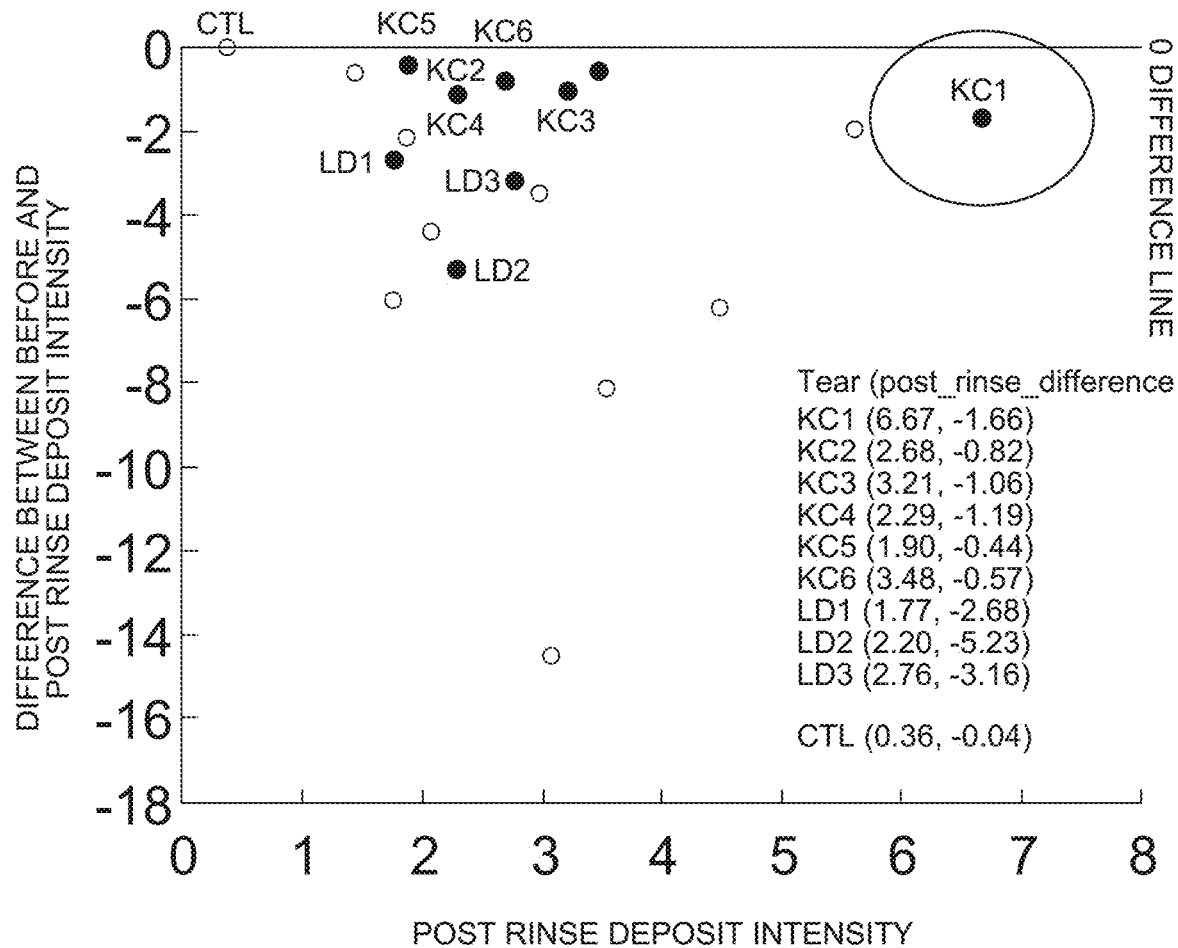
FIG. 8 shows an example difference vs. post rinse deposit score plot.

By plotting the difference (in deposition scores between before rinse and post rinse) vs. post rinse deposition score, the heavy depositors (i.e. KCl) are expected to occupy the top-right region of the plot (i.e., small difference and large post rinse deposition score. This expectation is met in FIG. 8. In particular, FIG. 8 shows an example difference vs. post rinse deposit score plot. High deposition should occupy the top-right region of the plot.

In summary, the specific example described herein successfully demonstrate a novel microfluidic system and method for quantifying contact lens deposition using μL or sub-μL human tears and small contact lens coupons. Initial results show that reproduction of human tear deposition may be achieved within about 30 minutes and computer image analysis may provide quantitative deposition scores that may distinguish heavy depositor from normal tears.

Imaging System

Imaging of contact lens deposit may be performed by a conventional upright light field microscope to obtain bright-field images, a conventional dark-field microscope to obtain low-background high contrast dark-field images, or a fluorescent microscope (upright or inverted) to obtain fluorescently labelled images.

In another aspect, a custom-built imaging setup (bright-field, dark-field or fluorescent) may be used to form a self-contained table-top system.

In another aspect, a miniature imaging device including a smartphone (with camera) may be used to form a portable or handheld system.

Table-Top Setup

A table-top contact lens deposition analysis system may comprise.

1. a microfluidic cartridge with on-board lens materials for tear deposition generation. A potential implementation may be illustrated in FIGS. 1 and/or 3;

2. an automated liquid handling system allowing liquid reagents manipulation (e.g., introduction, mixing, incubation, removal, etc.) on the microfluidic chip;

3. a custom-built imaging sub-system for bright-field, dark-field and/or fluorescent microscopy;

4. a built-in computer or microcontroller or FPGA to perform image analysis and deposition scoring; and 5. A user interface (e.g. a touchscreen) to allow user input/control and display the analysis results.

Smartphone Setup

Figure 9:
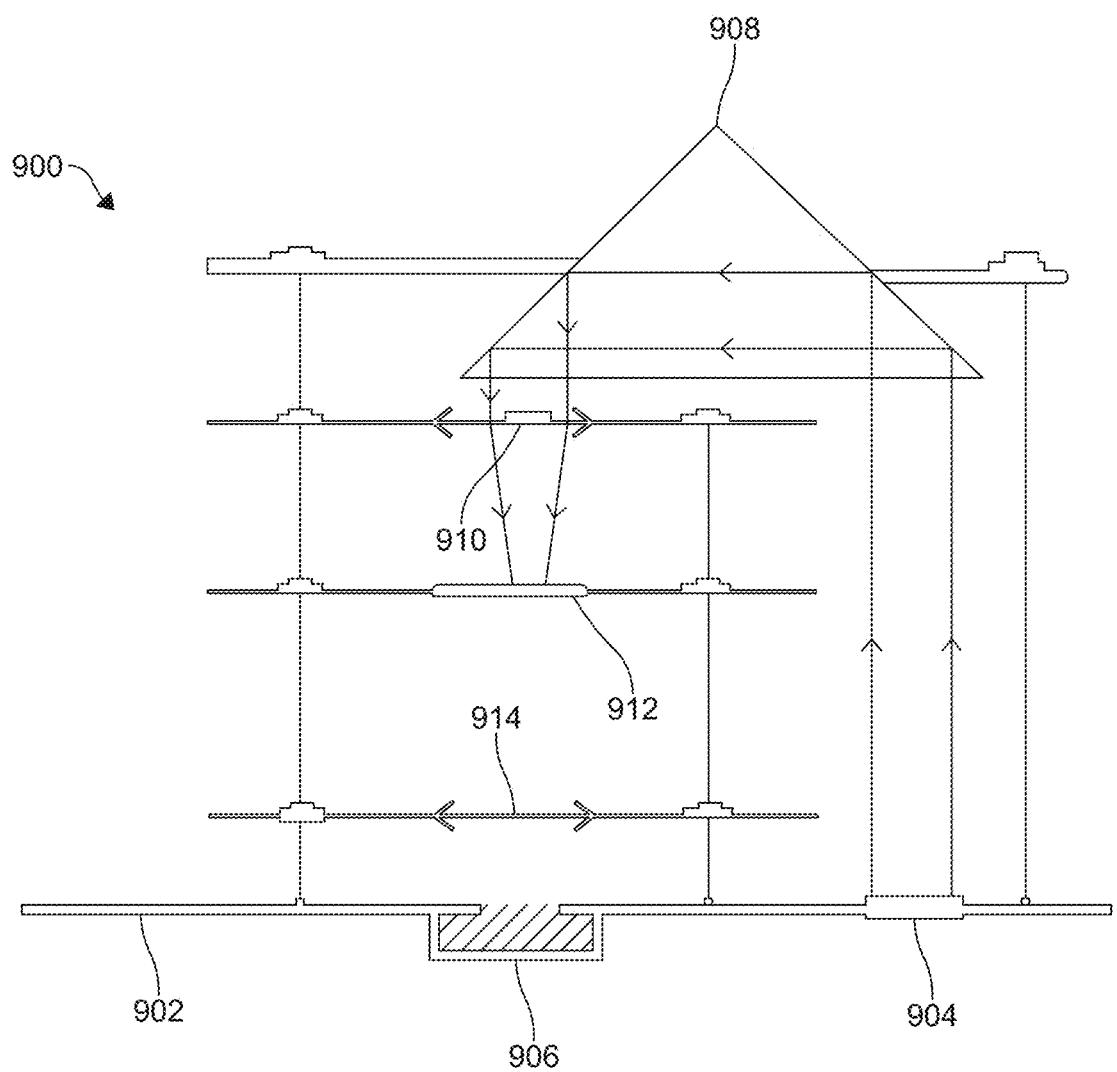
FIG. 9 shows an example of a smartphone based darkfield imaging system.

FIG. 9 shows an example of a smartphone based dark-field imaging system. FIG. 9 shows a schematic of a folded-path smartphone based dark-field microscope 900. A shown, a substrate 902 (e.g., phone case) may be configured with a light source 904 (e.g., light emitting diode) and a camera 906. Light emitted from the light source 904 may pass through an optical element 908, which may direct and/or focus light toward a condenser 910. The condenser may direct light toward a sample 912. A lens 914 may be disposed between the camera 906 and the sample 912. As such, the camera 906 may capture images of the sample 912.

Additional Analyses Capability

Beyond bright-field, dark-field, and fluorescent imaging with lipid or protein labels, microfluidic devices described herein may also be designed to perform other bioanalytical assays, such as protein quantification assays using ELISA, lipid quantification assays, bacterial detection for potential infection analysis, or other measurements such electrolytes. For example, an example microfluidic device described herein may comprise additional reservoirs to house reagents to perform analysis on things like lipids, etc.

Examples

Example 1: A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising: disposing a contact lens sample in the well of the microfluidic chip; disposing a first volume of first fluid in the well with the contact lens sample: capturing first images of the contact lens sample; causing evaporation of at least a portion of the first volume of the first fluid; disposing a second volume of second fluid in the well with the contact lens sample; causing evaporation of at least a portion of the second volume of the second fluid; disposing the microfluidic chip in a humidity chamber for a time period; capturing second images of the contact lens sample after the time period has expired; rinsing the contact lens sample with a third fluid; capturing third images of the contact lens after the rinsing; determining, using one or more of the first images, the second images, or the third images, a deposition metric; and outputting the deposition metric.

Example 2: A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising: disposing a contact lens sample in the well of the microfluidic chip; capturing a pre-tear image of the contact lens sample; disposing a volume of tear fluid in the well with the contact lens sample; capturing tear images of the contact lens sample; rinsing the contact lens sample; capturing post-rinse images of the contact lens after the rinsing; determining, using one or more of the pre-tear images, the tear images, or the post-rinse images, a deposition metric; and outputting the deposition metric.

Example 3: A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising: disposing a contact lens sample in the well of the microfluidic chip; disposing a volume of tear fluid in the well with the contact lens sample; capturing pre-rinse images of the contact lens sample; rinsing the contact lens sample; capturing post-rinse images of the contact lens after the rinsing; determining, using one or more of the tear images or the post-rinse images, a deposition metric; and outputting the deposition metric.

Example 4: A method for quantifying contact lens deposition, the method comprising: disposing a contact lens sample in a fluid well; disposing a volume of tear fluid in the well with the contact lens sample; capturing pre-rinse images of the contact lens sample; rinsing the contact lens sample; capturing post-rinse images of the contact lens after the rinsing; determining, using one or more of the tear images or the post-rinse images, a deposition metric; and outputting the deposition metric.

Example 5: A method for evaluating a contact lens wearer's compatibility with a lens material, the method comprising: exposing a contact lens sample to a volume of tear fluid from the wearer; capturing pre-rinse data of the contact lens sample; rinsing the contact lens sample; capturing post-rinse data of the contact lens sample after the rinsing, and comparing the pre-rinse data with the post-rinse data.

Example 6: The method of any of examples 1-5, wherein the microfluidic chip comprises hydrophilic material.

Example 7: The method of any of examples 1-6, wherein one or more of the well or the fluid conduit is configured to be hydrophilic.

Example 8: The method of any of examples 1-7, wherein the contact lens sample comprises a 1 mm lens coupon.

Example 9: The method of any of examples 1-8, wherein the first fluid comprises water.

Example 10: The method of any of examples 1-9, wherein the first fluid consists essentially of water.

Example 11: The method of any of examples 1-10, wherein the first fluid consists of water.

Example 12: The method of any of examples 1-11, wherein the first volume is less than 1 µL.

Example 13: The method of any of examples 1-12, wherein the first volume is about 0.5 µL.

Example 14: The method of any of examples 1-13, wherein the causing evaporation of at least a portion of the first volume of the first fluid comprises allowing for passive evaporation.

Example 15: The method of any of examples 1-14, wherein the first images comprise an optical microscopic image of the contact lens sample.

Example 16: The method of any of examples 1-15, wherein the first images comprise an optical microscopic image of a first side and a second opposite side of the contact lens sample.

Example 17: The method of any of examples 1-16, wherein the second fluid comprises tear fluid.

Example 18: The method of any of examples 1-17, wherein the second fluid consists essentially of tear fluid.

Example 19: The method of any of examples 1-18, wherein the second fluid consists of tear fluid.

Example 20: The method of any of examples 1-19, wherein the second volume is less than 1 µL.

Example 21: The method of any of examples 1-20, wherein the second volume is about 0.5 µL.

Example 22: The method of any of examples 1-21, wherein the causing evaporation of at least a portion of the second volume of the second fluid comprises allowing for passive evaporation.

Example 23: The method of any of examples 1-22, wherein the second images comprise an optical microscopic image of the contact lens sample.

Example 24: The method of any of examples 1-23, wherein the second images comprise an optical microscopic image of a first side and a second opposite side of the contact lens sample.

Example 25: The method of any of examples 1-24, wherein time period is about 20 minutes.

Example 26: The method of any of examples 1-25, wherein the third fluid comprises multipurpose solution.

Example 27: The method of any of examples 1-26, wherein the third fluid consists essentially of multipurpose solution.

Example 28: The method of any of examples 1-27, wherein the third fluid consists of multipurpose solution.

Example 29: The method of any of examples 1-28, wherein the third images comprise an optical microscopic image of the contact lens sample.

Example 30: The method of any of examples 1-29, wherein the third images comprise an optical microscopic image of a first side and a second opposite side of the contact lens sample.

Example 31: The method of any of examples 1-30, wherein the deposition metric comprises a normalized deposit area intensity.

Example 32: The method of any of examples 1-31, wherein the deposition metric comprises a normalized deposit area intensity before the rinsing.

Example 33: The method of any of examples 1-32, wherein the deposition metric comprises a normalized deposit area intensity after the rinsing.

Example 34: The method of any of examples 1-33, wherein the deposition metric comprises a difference between a deposit area intensity before the rinsing and a deposit area intensity after the rinsing.

What is claimed is:

1. A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising:
    disposing a contact lens sample in the well of the microfluidic chip;
    disposing a first volume of first fluid in the well with the contact lens sample;
    capturing first images of the contact lens sample;
    causing evaporation of at least a portion of the first volume of the first fluid;
    disposing a second volume of second fluid in the well with the contact lens sample;
    causing evaporation of at least a portion of the second volume of the second fluid;
    disposing the microfluidic chip in a humidity chamber for a time period;
    capturing second images of the contact lens sample after the time period has expired;
    rinsing the contact lens sample with a third fluid;
    capturing third images of the contact lens after the rinsing;
    determining, using one or more of the first images, the second images, or the third images, a deposition metric; and
    outputting the deposition metric.

2. The method of claim 1, wherein the microfluidic chip comprises hydrophilic material.

3. The method of claim 1, wherein one or more of the well or the fluid conduit is configured to be hydrophilic.

4. The method of claim 1, wherein the contact lens sample comprises a 1 mm lens coupon.

5. The method of claim 1, wherein the first fluid comprises water.

6. The method of claim 1, wherein the first fluid consists essentially of water.

7. The method of claim 1, wherein the first fluid consists of water.

8. The method of claim 1, wherein the first volume is less than 1 µL.

9. The method of claim 1, wherein the first volume is between 0.3 µL and 3 µL.

10. The method of claim 1, wherein the causing evaporation of at least a portion of the first volume of the first fluid comprises allowing for passive evaporation.

11. The method of claim 1, wherein the first images comprise an optical microscopic image of the contact lens sample.

12. The method of claim 1, wherein the first images comprise an optical microscopic image of a first side and a second opposite side of the contact lens sample.

13. The method of claim 1, wherein the second fluid comprises tear fluid.

14. The method of claim 1, wherein the second fluid consists essentially of tear fluid.

15. The method of claim 1, wherein the second fluid consists of tear fluid.

16. The method of claim 1, wherein the second volume is less than 1 µL.

17. The method of claim 1, wherein the second volume is between 0.3 µL and 3 µL.

18. The method of claim 1, wherein the causing evaporation of at least a portion of the second volume of the second fluid comprises allowing for passive evaporation.

19. The method of claim 1, wherein the second images comprise an optical microscopic image of the contact lens sample.

20. The method of claim 1, wherein the second images comprise an optical microscopic image of a first side and a second opposite side of the contact lens sample.

21. The method of claim 1, wherein time period is between 10-20 minutes.

22. The method of claim 1, wherein the third fluid comprises multipurpose solution.

23. The method of claim 1, wherein the third fluid consists essentially of multipurpose solution.

24. The method of claim 1, wherein the third fluid consists of multipurpose solution.

25. The method of claim 1, wherein the third images comprise an optical microscopic image of the contact lens sample.

26. The method of claim 1, wherein the third images comprise an optical microscopic image of a first side and a second opposite side of the contact lens sample.

27. The method of claim 1, wherein the deposition metric comprises a normalized deposit area intensity.

28. The method of claim 1, wherein the deposition metric comprises a normalized deposit area intensity before the rinsing.

29. The method of claim 1, wherein the deposition metric comprises a normalized deposit area intensity after the rinsing.

30. The method of claim 1, wherein the deposition metric comprises a difference between a deposit area intensity before the rinsing and a deposit area intensity after the rinsing.

31. A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising:
    disposing a contact lens sample in the well of the microfluidic chip;
    capturing a pre-tear image of the contact lens sample;
    disposing a volume of tear fluid in the well with the contact lens sample;
    capturing a tear image of the contact lens sample;
    rinsing the contact lens sample;
    capturing a post-rinse image of the contact lens after the rinsing;
    determining, using one or more of the pre-tear images, the tear images, or the post-rinse images, a deposition metric; and
    outputting the deposition metric.

32. The method of claim 31, wherein the contact lens sample comprises a 1 mm lens coupon.

33. The method of claim 31, wherein the pre-tear image comprises an optical microscopic image of the contact lens sample.

34. The method of claim 31, wherein the pre-tear image comprises an optical microscopic image of a first side and a second opposite side of the contact lens sample.

35. The method of claim 31, wherein the volume of tear fluid is less than 1 µL.

36. The method of claim 31, wherein the volume of tear fluid is between 0.3 µL and 3 µL.

37. The method of claim 31, wherein the tear image comprises an optical microscopic image of the contact lens sample.

38. The method of claim 31, wherein the tear image comprises an optical microscopic image of a first side and a second opposite side of the contact lens sample.

39. The method of claim 31, wherein the post-rinse image comprises an optical microscopic image of a first side and a second opposite side of the contact lens sample.

40. The method of claim 31, wherein the deposition metric comprises a normalized deposit area intensity.

41. The method of claim 31, wherein the deposition metric comprises a normalized deposit area intensity before the rinsing.

42. The method of claim 31, wherein the deposition metric comprises a normalized deposit area intensity after the rinsing.

43. The method of claim 31, wherein the deposition metric comprises a difference between a deposit area intensity before the rinsing and a deposit area intensity after the rinsing.

44. A method for quantifying contact lens deposition using a microfluidic chip comprising a well in fluid communication with a fluid conduit, wherein the fluid conduit is in selective communication with a fluid inlet and a fluid outlet to control passage of fluid through the fluid conduit and into the well, the method comprising:
   disposing a contact lens sample in the well of the microfluidic chip;
   disposing a volume of tear fluid in the well with the contact lens sample;
   capturing tear images of the contact lens sample;
   rinsing the contact lens sample;
   capturing post-rinse images of the contact lens after the rinsing;
   determining, using one or more of the tear images or the post-rinse images, a deposition metric; and
   outputting the deposition metric.

45. The method of claim 44, wherein the contact lens sample comprises a 1 mm lens coupon.

46. The method of claim 44, wherein the volume of tear fluid is less than 1 µL.

47. The method of claim 44, wherein the volume of tear fluid is between 0.3 µL and 3 µL.

48. The method of claim 44, wherein the tear image comprises an optical microscopic image of the contact lens sample.

49. The method of claim 44, wherein the tear image comprises an optical microscopic image of a first side and a second opposite side of the contact lens sample.

50. The method of claim 44, wherein the post-rinse image comprises an optical microscopic image of a first side and a second opposite side of the contact lens sample.

51. The method of claim 4, wherein the deposition metric comprises a normalized deposit area intensity.

52. The method of claim 44, wherein the deposition metric comprises a normalized deposit area intensity before the rinsing.

53. The method of claim 44, wherein the deposition metric comprises a normalized deposit area intensity after the rinsing.

54. The method of claim 44, wherein the deposition metric comprises a difference between a deposit area intensity before the rinsing and a deposit area intensity after the rinsing.

55. A method for quantifying contact lens deposition, the method comprising:
   disposing a contact lens sample in a fluid well;
   disposing a volume of tear fluid in the well with the contact lens sample;
   capturing pre-rinse images of the contact lens sample;
   rinsing the contact lens sample;
   capturing post-rinse images of the contact lens after the rinsing;
   determining, using one or more of the pre-rinse images or the post-rinse images, a deposition metric; and
   outputting the deposition metric.

56. The method of claim 55, wherein the contact lens sample comprises a 1 mm lens coupon.

57. The method of claim 55, wherein the pre-rinse images comprise an optical microscopic image of the contact lens sample.

58. The method of claim 55, wherein the pre-rinse image comprise an optical microscopic image of a first side and a second opposite side of the contact lens sample.

59. The method of claim 55, wherein the volume of tear fluid is less than 1 µL.

60. The method of claim 55, wherein the volume of tear fluid is between 0.3 µL and 3 µL.

61. The method of claim 55, wherein the post-rinse image comprises an optical microscopic image of a first side and a second opposite side of the contact lens sample.

62. The method of claim 55, wherein the deposition metric comprises a normalized deposit area intensity.

63. The method of claim 55, wherein the deposition metric comprises a normalized deposit area intensity before the rinsing.

64. The method of claim 55, wherein the deposition metric comprises a normalized deposit area intensity after the rinsing.

65. The method of claim 55, wherein the deposition metric comprises a difference between a deposit area intensity before the rinsing and a deposit area intensity after the rinsing.

66. A method for evaluating a contact lens wearer's compatibility with a lens material, the method comprising:
   exposing a contact lens sample to a volume of tear fluid from the wearer;
   capturing pre-rinse data of the contact lens sample;
   rinsing the contact lens sample;
   capturing post-rinse data of the contact lens sample after the rinsing; and
   comparing the pre-rinse data with the post-rinse data.

67. The method of claim 66, wherein the contact lens sample comprises a 1 mm lens coupon.

68. The method of claim 66, wherein the pre-rinse data comprises an image of the contact lens sample.

69. The method of claim 66, wherein the pre-rinse data comprises an image of a first side and a second opposite side of the contact lens sample.

70. The method of claim 66, wherein the pre-rinse data comprises a bright-field image, a dark-field image, a phase-contrast image, a differential interference contrast (DIC) image, or a fluorescent microscope image, or a combination thereof.

71. The method of claim 66, wherein the volume of tear fluid is less than 1 µL.

72. The method of claim 66, wherein the volume of tear fluid is between 0.3 µL and 3 µL.

73. The method of claim 66, wherein the post-rinse data comprises an optical microscopic image of a first side and a second opposite side of the contact lens sample.

74. The method of claim 66, wherein the post-rinse data comprises a bright-field image, a dark-field image, a phase-contrast image, a differential interference contrast (DIC) image, or a fluorescent microscope image, or a combination thereof.

75. The method of claim 66, further comprising determining, based at least on comparing the pre-rinse data with the post-rinse data, a deposition metric.

76. The method of claim 75, wherein the deposition metric comprises a normalized deposit area intensity.

77. The method of claim 75, wherein the deposition metric comprises a normalized deposit area intensity before the rinsing.

78. The method of claim 75, wherein the deposition metric comprises a normalized deposit area intensity after the rinsing.

79. The method of claim 75, wherein the deposition metric comprises a difference between a deposit area intensity before the rinsing and a deposit area intensity after the rinsing.

* * * * *